A. SUNDH.
COUPLING FOR FLEXIBLE TUBING.
APPLICATION FILED OCT. 22, 1913.

1,139,821.

Patented May 18, 1915.

WITNESSES:
Joseph E. Cavanaugh
F. Graves

INVENTOR
August Sundh
BY
E. W. Marshall
ATTORNEY

UNITED STATES PATENT OFFICE.

AUGUST SUNDH, OF HASTINGS-UPON-HUDSON, NEW YORK.

COUPLING FOR FLEXIBLE TUBING.

1,139,821.  Specification of Letters Patent.  Patented May 18, 1915.

Application filed October 22, 1913. Serial No. 796,565.

*To all whom it may concern:*

Be it known that I, AUGUST SUNDH, a citizen of the United States, and a resident of Hastings-upon-Hudson, in the county of Westchester and State of New York, United States of America, have invented certain new and useful Improvements in Couplings for Flexible Tubing, of which the following is a specification, reference being had to the accompanying drawings, forming a part thereof.

My invention relates to couplings for flexible tubing and its object is to provide a simple and efficient device for this purpose.

I will describe my invention in the following specification and point out the novel features thereof in appended claims.

Figure 1:
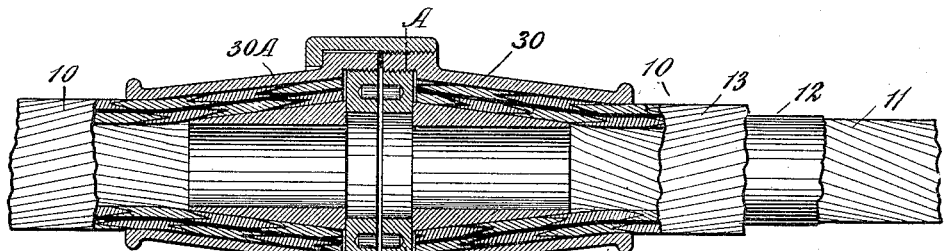
Figure 3:
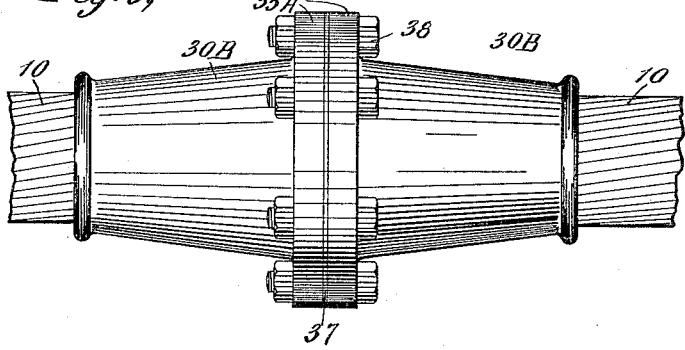
Figure 2:
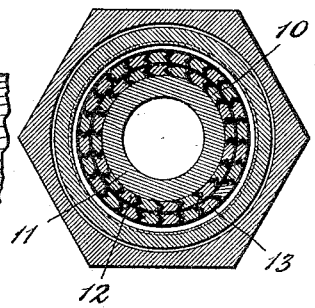
Figure 5:
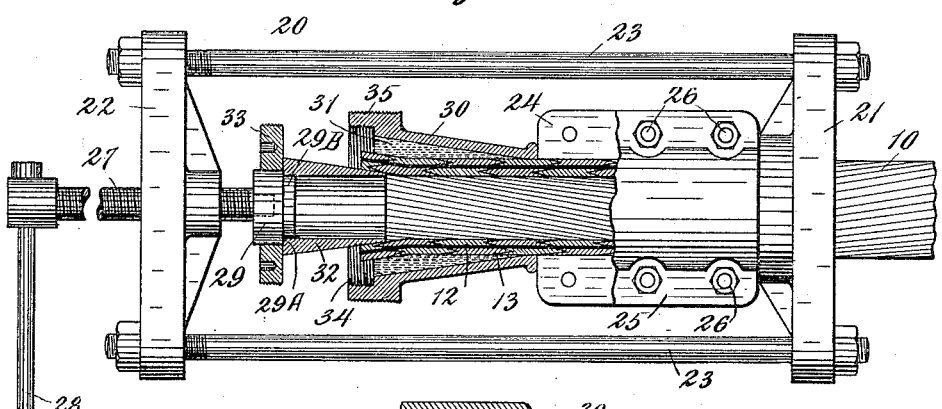
Figure 4:
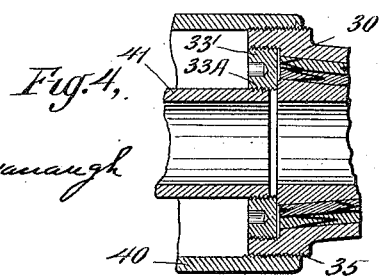

Referring to the drawings,—Figure 1 is a longitudinal sectional view of an improved coupling which embodies my invention, applied to unite two flexible tubes which are shown partly in section. Fig. 2 is a transverse section through line A B of Fig. 1. Fig. 3 is a side elevation of a modified structure which also embodies my invention. Fig. 4 is a fragmentary sectional view of a part of one of my improved couplings showing how it may be applied to unite a flexible tube to a pipe. Fig. 5 is a plan view partly in section of a mechanism which I use in applying the members of my coupling to the ends of flexible tubes.

Like characters of reference designate corresponding parts in all of the figures.

10 designates a flexible tubing such as a flexible armored conduit. It may be made of any prefererd design or construction, such, for example, as that shown and described in a former Patent No. 630,637 which was issued to me on the 8th day of August 1899. In the drawings it is shown as constructed of three parts, an inner core 11 which may be made of some resilient material such as rubber, an intermediate protecting cover 12 and an outer protecting cover 13 of steel or other suitable material.

Referring now to Fig. 5, I will show a device which I use for applying my improved coupling to the end of a flexible tubing.

20 designates a screw-clamp of special construction which I have made for this purpose. It comprises two end frames 21 and 22 which may be rigidly held together by means of rods 23, 23. To the end frame 21 a two-part clamp 24—25 is provided. These two parts are designed to tightly fit over the outside of the tubing to which the coupling is to be applied, and to be bolted together by means of bolts 26 in such a way as to firmly hold the tube 10 between them. The other end frame 22 is provided with a centrally disposed screw 27 to one end of which a handle or lever 28 is applied, and to the opposite end of which a loose head 29 of special construction is applied.

30 designates one of the outer members of my improved coupling which is preferably circular in cross-section. It is slipped over the end of flexible tubing 10 into the position in which it is shown in Fig. 5. It may be seen that its inner surface is made tapering with its smallest diameter approximately equal to the outer diameter of the flexible tubing. Consequently, there is a tapering annular space between the inner surface of this outer member and the flexible tube. This annular space 31 is then filled with a plastic material. A tapered bushing 32, the inner portion of which is bored out to a diameter approximately equal to the diameter of the inside diameter of the flexible tubing 10, and the smallest outside diameter of which is approximately the same, is then placed on the inside of the flexible tubing. A shoulder 29$^A$ of the head 29 is designed to rest upon the other end of this tapered bushing while another portion 29$^B$ of the head 29 may be placed within the tapered bushing 32 and serve as a guide to the same and to keep it from crushing when subjected to pressure. A threaded collar 33 is placed on the head 29 as shown. Now, when the parts are in these positions, the screw 27 may be turned by the handle 28, and the tapered bushing 32 may thereby be forced into the flexible tubing 10. In doing so it will spread the protective coverings 12 and 13 and force them against the inner surface of the outer coupling member 30. At the same time the plastic material 31 will be displaced by this action and will be forced under pressure into and between all the openings which may be made by the spreading of the protective coverings. The threaded bushing 33 will then be screwed into a threaded portion 34 of the outer coupling member 30. After the parts have thus been forced together and the threaded collar 33 has been screwed into place, the screw-clamping device 20 may be removed by unscrewing the bolts 26 and separating the two clamping parts 24 and 25, and the screw 27 may also be backed off.

The coupling member 30 is thus securely attached to the end of the flexible tubing 10. A similar coupling 30^A may be attached to the end of another flexible tubing 10, and the two coupling members 30 and 30^A may then be united in any desired manner.

Fig. 1 shows one method of uniting two such coupling members 30 and 30^A. In this case the outer flange of the coupling 30 is provided with screw-threads 35 as previously described, while a similar flange of the opposite coupling member 30^A need not have such threads cut upon it. A threaded outer collar 36 is however placed over the coupling member 30^A and screwed over the threaded portion 35 of the coupling member 30 in the manner commonly used in pipe unions. A packing 37 may be placed between the two coupling members 30 and 30^A if desired. The view shown in Fig. 2 is of the above method of uniting the two coupling members.

In Fig. 3 another method of uniting two coupling members is shown. In this case the coupling members 30^B, 30^B are provided with flanges 35^A, 35^A through which bolts 38 may be passed and arranged to hold the two parts securely together.

In Fig. 4 I have shown that if desired a pipe 40 may be secured directly onto the threaded flange 35 of the coupling member 30. This figure also shows that the inside of the threaded collar 33' may also be threaded as is shown at 33^A, and if this is done, a pipe 41 may be secured directly into the threaded collar 33^A as is also shown in Fig. 4.

When the flexible tubing is connected in the above described manner it may be used in many ways such for example, as a protective conduit for electrical conductors or for steam pipes, or for the purpose of carrying off the exhaust gases from explosive engines.

I have shown several modifications of this invention in order to show that it is not limited to any one construction or method of use. It is believed that a coupling of this nature is broadly new and I therefore do not mean to impose other limitations than those in the appended claims.

What I claim is:

1. A coupling for flexible tubing comprising an external member having a conically shaped interior adapted to be placed over the end of the tubing, a conically shaped bushing adapted to fit into the tubing and arranged to be forced into the tubing under pressure to expand said tubing against the inner surface of said external member and a plastic material between said external member and the internal bushing.

2. A coupling for flexible tubing comprising an external member having a conically shaped interior adapted to be placed over the end of the tubing, a conically shaped bushing adapted to fit into the tubing and arranged to be forced into the tubing under pressure, to expand said tubing against the inner surface of said external member, a plastic material between said external member and the internal bushing and a threaded bushing arranged to securely hold said parts together.

3. A coupling for flexible tubing comprising an external member having a conically shaped interior adapted to be placed over the end of the tubing, a conically shaped bushing adapted to fit into the tubing and arranged to be forced into the tubing under pressure to expand said tubing against the inner surface of said external member, a plastic material between said external member and the internal bushing and a threaded bushing arranged to hold said parts securely together, said external member being provided with means for attaching said member to another external member.

4. A coupling for flexible tubing comprising an external member having a conically shaped interior adapted to be placed over the end of the tubing, a conically shaped bushing adapted to fit into the tubing and arranged to be forced into the tubing under pressure to expand said tubing against the inner surface of said external member, a plastic material between said external member and the internal bushing and a threaded bushing arranged to hold the parts securely together, said external member being provided with screw-threads with which said threaded bushing engages.

5. A coupling for flexible tubing comprising a pair of external members each having a conically shaped interior adapted to be placed over the respective ends of the tubing, a pair of conically shaped bushings each adapted to fit into the tubing within one of said external members and arranged to be forced into the tubing under pressure to expand the tubing against the inner surface of its respective external member, a plastic material between said external members and the internal bushings, threaded bushings arranged to securely hold said parts together and means for attaching the two external members together.

6. A coupling for flexible tubing comprising a pair of external members, each having a conically shaped interior adapted to be placed over the respective ends of the tubing, a pair of conically shaped bushings, each adapted to fit into the tubing within one of said external members and arranged to be forced into the tubing under pressure to expand the tubing against the inner surface of its respective external member, a plastic material between said external members and the internal bushings, threaded bushings arranged to securely hold said parts together, one of said external members being provided with screw-threads and the other of said external members being provided with a threaded collar adapted to fit into the screw-threads of the first member to securely hold the two external members together.

In witness whereof, I have hereunto set my hand this 21st day of October 1913.

AUGUST SUNDH.

Witnesses:
JAMES G. BETHELL,
WALTER C. STRANG.

Copies of this patent may be obtained for five cents each, by addressing the "Commissioner of Patents, Washington, D. C."